United States Patent [19]

Beckmann et al.

[11] 4,144,376

[45] Mar. 13, 1979

[54] PROCESS FOR THE PRODUCTION OF MODIFIED, PARTIALLY ACETALIZED POLYVINYL ALCOHOL FILMS

[75] Inventors: Rolf Beckmann, Siegburg; Wilhelm Knackstedt, Troisdorf, both of Fed. Rep. of Germany

[73] Assignee: Dynamit Nobel Aktiengesellschaft, Fed. Rep. of Germany

[21] Appl. No.: 777,471

[22] Filed: Mar. 14, 1977

Related U.S. Application Data

[63] Continuation of Ser. No. 554,652, Mar. 3, 1975, abandoned.

[30] Foreign Application Priority Data

Mar. 2, 1974 [DE] Fed. Rep. of Germany ....... 2410153

[51] Int. Cl.² .............. B32B 17/10; C03C 27/12; C08K 5/54; C08L 29/14
[52] U.S. Cl. .............. 428/429; 260/30.6 R; 260/31.6; 260/31.8 C; 260/31.8 L; 260/29.1 SB; 428/437; 526/1
[58] Field of Search .......... 260/29.15 B, 30.6 R, 260/31.6, 31.8 C, 31.8 L; 428/429, 437; 526/1

[56] References Cited

U.S. PATENT DOCUMENTS 2,400,957  5/1946  Stamatoff ................. 260/73 R
3,341,399  9/1967  Hazdra et al. ............. 428/429
3,434,915  3/1969  Garrison ................... 260/73 R

FOREIGN PATENT DOCUMENTS 1596781  5/1970  Fed. Rep. of Germany.
1093864  12/1967  United Kingdom.

OTHER PUBLICATIONS

"Chemie und Technologie der Silicone," Von Prof. Dr. Walter Noll, 1960, p. 10.

*Primary Examiner*—Allan Lieberman
*Attorney, Agent, or Firm*—Craig & Antonelli

[57] ABSTRACT

A process for adjusting the adhesive force or strength of a plasticizer-containing, partially acetalized polyvinyl alcohol film to inorganic glasses to the pummel adhesion values required for a given application involves the addition of at least one silane while the resin is processed into a film by conventional methods in predetermined amounts. The suitable silanes include:

(a) a silicon-functional silane or a mixture of various silicon-functional silanes for reducing the adhesive force; or
(b) a silicon-organofunctional silane or a mixture of silicon-organofunctional silanes for increasing the adhesive force; or
(c) a mixture of at least one silicon-functional silane with at least one silicon-organofunctional silane.

22 Claims, No Drawings

PROCESS FOR THE PRODUCTION OF MODIFIED, PARTIALLY ACETALIZED POLYVINYL ALCOHOL FILMS

CROSS-REFERENCE TO RELATED APPLICATION

This is a continuation of application Ser. No. 554,652, filed Mar. 3, 1975, and now abandoned.

Composite window panes are known which consist of two or more glass panes and an adhesive film, for example of a partially acetalized polyvinyl alcohol, which bonds the glass panes together.

It is furthermore known to employ as the adhesive film, in the manufacture of glass/synthetic resin composite windows, plasticized polyvinyl butyral (PVB). Suitable synthetic resin plates which may be used in place of one or more of the glass plates, are especially those of amorphous polyamides (such plates are disclosed in German Pat. No. 1,596,781).

For the production of composite safety panes wherein for safety reasons a particularly shatterproof bond is required, the films which have proved to be especially suitable are plasticized, partially butyralized polyvinyl alcohol films having a moisture content of 0.2–0.9% by weight, free OH-groups (calculated as vinyl alcohol) of about 10 to about 25, preferably about 16 to about 23% by weight, and a plasticizer content of about 18 to about 65 parts by weight preferably 33–44 parts by weight per 100 parts by weight of partially butyralized PVA.

Composite safety glass panes, consisting of two glass plates and an adhesive film bonding the glass plates together, the film being made preferably of partially butyralized PVA, are utilized especially as windshields in automotive vehicles wherein optionally one of the glass plates can be replaced by a synthetic resin plate, such as a plate of an amorphous polyamide. Such silicate glass/silicate glass or silicate glass/synthetic resin composites are also employed in the construction field, for example as window panes or as partitions; depending on the particular use, for example as compound safety glasses. Multiple composites are also utilized, i.e. composite elements consisting of more than two load-bearing layers.

The partially acetalized polyvinyl alcohols, as known to the experts for many years, are produced by the saponification of polyvinyl acetate and subsequent acetalization with aldehydes, such as, for example, formaldehyde, acetaldehyde, propionaldehyde, butyraldehyde, and the like. These compounds contain, in most cases, about 0.5 to about 5% by weight, mostly about 0.5 to about 1.2% by weight of acetyl groups, calculated as vinyl acetate residues. Acetyl groups are defined and calculated as vinylacetate. Also, other polyvinyl esters of aliphatic acids of up to 9 carbon atoms can be, as is well known, saponified and subsequently acetalized. See., e.g. DRP 480,866, DRP 407,962 and U.S. Pat. No. 2,400,957.

The partially acetalized polyvinyl alcohol resins, called "PVA resins" hereinbelow, are processed into films together with plasticizers, optionally stabilizers, as well as, if desired, further additives in devices known for film production, for example in extruders. To adjust the films to the moisture content required for composite safety glasses, they are after-treated, if necessary, in a climatic chamber.

In practice, composite safety glass panes are in most cases manufactured by first producing a preliminary bonded unit from the load-bearing individual layers or plates and the adhesive film at an elevated temperature, the laminate being suitably ventilated. Therefore, this preliminary composite is finally bonded under the effect of temperature and pressure, for example in an autoclave, e.g. under pressures of about 10 to about 15 kp./cm$^2$ and temperatures of between about 130° to about 150° C.

The thickness of the individual layers of composite safety glass panes can be varied as desired, depending on the purpose for which they are used. For automobile windshields, the following layer thicknesses have proved to be advantageous: glass thickness of from 1 to 3 mm., preferably 2 mm.; film thickness of from about 0.30 to 0.80 mm., preferably 0.76 mm; thickness of glass = 2 to 4 mm., preferably 3 mm.

Suitable plasticizers for the resins are esters of polyvalent acids or of polyhydric alcohols, e.g. dibutyl sebacate, di-($\beta$-butoxyethyl) adipate, dioctyl phthalate, triethylene glycol bis-diethyl acetate, triethylene glycol di(2-ethylbutyrate), and the like. Also suitable are neutral esters of the phosphoric acid, for example, tricresylphosphate and trioctylphosphate.

In composite safety glass panes used as windshields in automotive vehicles, the adhesive force or strength of the glass-to-film bond must be at an optimum for this purpose. For example, when the windshield is destroyed by the force of an impact in case of very high adhesion, a penetration by the impact tool, e.g. a hammer or falling body, in the center of impact occurs without a large amount of glass being shattered. In case of very poor adhesion, the impact tool, is elastically caught by the film, but the shattering effect is very great. In case of a collision, with the windshield being destroyed by the impact of the driver's or passenger's head, the film is to gradually dissipate the kinetic energy by stretching to thereby avoid penetration, on the one hand; and on the other hand, the destroyed glass still is to adhere sufficiently well to the film so that dangerous cut wounds are avoided. For this reason, the adhesive force must be set at an optimum value to reduce penetration and to avoid shattering of the glass.

In contrast thereto, when the product is to be used as construction glass, for example as a window pane, a higher adhesive force of the glass-to-film bond is desirable, because in this case injuries due to cuts are to be primarily eliminated and the need to avoid penetration is less.

The problem of gaining control over the adhesion of a glass plate to a partially acetalized PVA film plays an important part in the manufacture of a windshield sector of an automobile. It is known that plasticized, partially butyralized PVA films generally exhibit very high adhesion to glass. This property is, however, undesirable for the windshield sector. Pummel adhesion values of 2 to 4 are desirable for windshields in the automobile construction. The test methods for obtaining pummel adhesion values are described in Great Britain Pat. No. 1,093,864 corresponding to U.S. Pat. No. 3,434,915.

The literature contains quite a number of publications dealing with the problem of windshield manufacture for automobile vehicles and wherein it is proposed to obtain a reduction in the adhesive force between the glass and film by the addition of salts of organic acids to the film. However, these conventional methods have the disadvantage that a number of the salts causes discoloration of the film. Besides, in such additives there is the danger that the film becomes detached from the glass surface, since the salts are sensitive to the moisture and thus have a deleterious effect on the moisture content of the adhesive film. Additionally, these compounds merely exhibit a reducing effect on the adhesive force.

It is also known to effect or control the adhesion of a synthetic resin to an inorganic substrate by means of certain organo-silicon compounds. Such compounds are the silanes. The silanes are substitution products of silicon hydride. The substituents can be of various character. According to Noll, "Chemie und Technik der Silikone" [Chemistry and Technology of the Silicones], 2nd Ed. published by Verlag Chemie, Weinheim, 1968, p. 10, the silanes are classified in the groups "only silicon-functional", "only organofunctional", and "silicon- and organofunctional". In the "silicon-functional" silanes, the functional groups, such as, for example, halogens or alkoxy groups, are directly linked to the Si atom. Such groups can be readily hydrolyzed. The "organofunctional groups" are bound to silicon via one or more carbon atoms and are reactive, for example, due to amino or epoxy groups forming the functional group or on the basis of double bonds contained therein. This nomenclature, introduced by Noll, is also employed hereinbelow.

It is known from U.S. Pat. No. 3,341,399 to bond glass plates together with the use of a silane-treated PVB film. Suitable silanes suggested in this connection are "silicon-functional" as well as "silicon- and organofunctional silanes", namely aminoalkyl triethoxysilane, alkyl triethoxysilane, aryl triethoxysilane and vinyl triethoxysilane. These compounds are added to the PVB in amounts from 1 to 10% by weight. This process is based on the problem of increasing the shear strength as well as the steam or vapor resistance of the bond. The controlled adjustment of the adhesive force between the plasticizer-containing, partially acetalized PVA films and the inorganic glasses to the pummel adhesion values required for the respective usage is not suggested in the U.S. patent.

This invention relates to a process for adjusting or setting the adhesive force between plasticizer-containing, partially acetalized polyvinyl alcohol films and inorganic glasses to the pummel adhesion values required for the respective purpose of the intended application, which process is characterized in that there are added to the partially acetalized polyvinyl alcohol resins, before or while it is processed into a film in accordance with conventional procedures, predetermined amounts of any one of the following materials:

(a) A silicon-functional silane or a mixture of various silicon-functional silanes to reduce the adhesive force; or (b) a silicon and organofunctional silane or a mixture of silicon and organofunctional silanes to increase the adhesive force; or (c) a mixture of at least one silicon-functional silane with at least one silicon and organofunctional silane to regulate or adjust the adhesive force.

The present invention furthermore relates to composite safety glass panes produced with the use of such modified, partially acetalized polyvinyl alcohol films.

According to the invention, preferably used as the "silicon-functional" silanes are those of the general formula:

$$R_n - Si - R'_{4-n}$$

wherein R represents alike or different, saturated, straight-chain or branched alkyl groups of 1–18 carbon atoms, R' represents halogen, preferably Cl, or identical or different saturated alkoxy groups of 1–8 carbon atoms, or oxy-alkoxy groups, as e.g. —OCH$_2$—CH$_2$—O—CH$_3$ or —OCH$_2$—CH$_2$—O—CH$_2$—CH$_3$ and n is 0 to 3.

Examples in this connection are the following: propyltriethoxysilane, propyltrimethoxysilane, isopropyldimethoxyethoxysilane, n-butyl- or isobutyl triethoxy- or -trimethoxy- or trimethoxysilane, and the like.

According to the invention, preferred "silicon-organofunctional" silanes which increase the adhesive force are those of the general formula:

$$R^1_{n'} \text{Si} - A_p - Z$$
$$\quad\quad |$$
$$\quad R'_{3-n'}$$

wherein

R$^1$ represents a hydrolyzable group, e.g., as Cl, and —OR'' (R'' = C$_{1-18}$ alkyl or oxy-alkyl groups, see above.

R' represents an alkyl group of 1–18 carbon atoms,

A represents a bivalent alkylene groups of 1–10 carbon atoms, which can optionally be branched.

Z represents a functional group, e.g.

$$-\text{CH}-\!\!\!-\!\!\!-\text{CH}_2$$
$$\quad \backslash\;/$$
$$\quad\;\; \text{O}$$

or —CH 50 CH$_2$ or NR''' R'''', wherein R''' represents H or aminoalkyl of 2–8 carbon atoms in the alkyl residue and R'''' is H or R''', and n' is an integer from 1 to 3 and, p is 1 or, in case Z = —CH=CH$_2$, is 0.

Such "silicon-organofunctional" silanes are accordingly bifunctional. In addition to at least one hydrolyzable group reacting in the composite with the glass surface, at least one reactive group must furthermore be present which can react with the partially acetalized PVA film. Examples of such silanes are the following:

Vinyltrichlorosilane, vinyltrimethoxysilane, vinyltriethoxysilane, vinyltris (β-methoxyethoxy)silane, γ-methacryloxypropyltrimethoxysilane, γ-glycidyloxypropyltrimethoxysilane, γ-aminopropyltriethoxysilane, and the like.

According to this invention, isobutyltrimethoxysilane is preferably employed as the "silicon-functional" silane, and γ-glycidyloxypropyltrimethoxysilane is utilized preferably as the "silicon-organofunctional" silane.

In the process of this invention, the starting compounds are partially acetalized polyvinyl alcohol resins which still contain OH-groups. Preferably, those substances are utilized containing 10–25% by weight, preferably 17–23% by weight of vinyl alcohol residues. Partially butyralized polyvinyl alcohol is preferably employed.

In composite safety glass sheets utilized in the construction field, for example as window panes or partitions, the adhesive strength of the bond between the inorganic glass and the film is of decisive importance. If the glass sheet is destroyed by carelessness, the glass must tightly adhere to the film, so that grave cut injuries are avoided. Composite panes wherein high pummel adhesion values are desired are therefore produced preferably with the use of partially acetalized polyvinyl alcohol films (called partially acetalized PVA films hereinbelow), the adhesive strength of which has been set to maximally high pummel adhesion values by the addition of "silicon-organofunctional" silanes or mixtures thereof to the corresponding partially acetalized PVA resins.

The process of this invention has the advantage that the adhesive strength between a partially acetalized PVA film and inorganic glasses can be adjusted to an optimum pummel value adapted to the respective purpose for which the product is used. Thus, it is possible, for example, to convert a partially acetalized PVA resin batch into "windshield quality" if such batch, as determined by a preliminary experiment, leads to a glass/partially acetalized PVA film/glass composite which can be utilized due to a high pummel adhesion value as a composite safety glass in the construction field, but not as a windshield in automotive vehicles, and this is done by adding a quantity, determined in the preliminary experiment, of a silicon-functional silane which reduces the adhesive force.

Conversely, a partially acetalized PVA resin of a "windshield quality" can be converted into a product with "construction quality" by adding an amount of a silicon-organofunctional silane determined in a preliminary experiment. Therefore, one is extensively independent of the respective quality of the partially acetalized PVA resins to be processed. The storage of two different materials, as heretofore customary in most cases, becomes unnecessary.

Film material discarded as waste by the composite window industry is usually accepted by the film producers and, after a refining procedure, is processed together with fresh material into new film in the extruder.

However, the quality of the new films is thereby affected in an uncontrollable manner. In most cases, the waste materials are not returned without first strictly sorting the materials according to windshield or construction quality. Therefore, an undefined mixture of waste materials leads to films having an undefinable adhesion factor with respect to the glass. It is now possible according to this invention to process, by means of a suitable combination of the types of silane used according to the invention, also unsorted wastes to films having a defined adhesive strength.

Experiments with various partially acetalized PVA film compositions of an unknown and differing quality with respect to pummel adhesion values showed that the desired objective can be reached by adding to the film composition a mixture consisting of a "silicon-organofunctional" silane increasing the adhesive strength and a "silicon-functional" silane reducing the adhesive strength. The amount of the silane to be added and/or the type of silane to be added are dependent on the purpose for which the composite panes are employed, as well as on the properties of the partially acetalized PVA resin to be modified. These factors depend on the pummel adhesion value of the unmodified partially acetalized PVA film.

The adhesive strength of a glass pane when bonded to a plasticizer-containing, partially acetalized polyvinyl alcohol film is determined in accordance with the so-called "pummel adhesion test." A composite glass pane (glass/partially acetalized PVA film/glass) having a size of about 150 × 300 mm. is cooled for about 2-8 hours at −18° C. ± 0.5° C. The pane is then placed on a metal block inclined by about 45° and pounded or pummeled with a flat-head hammer until the glass is pulverized. The testing area is of a size of about 100 × 150 mm. The adhesion is evaluated according to a scale from 0 to 10. These values mean the following:

| % Free Film Surface | Pummel Adhesion Value |
|---|---|
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

Visual observation is facilitated by the fact that besides the indicated pummel adhesion values on the scale, there are also illustrations beside the respective pummel adhesion value. It has been found that this—non-quantitative—"pummel adhesion test" is completely sufficient for practical purposes, and that the setting of the desired adhesive force can be effected with sufficient accuracy on the basis of the visual evaluation.

In case the pummel adhesion value of the resin to be modified cannot be predetermined due to an addition of film wastes, a minimum amount of a "silicon-organofunctional" silane leading to the highest pummel value is advantageously added thereto; at the same time, the amount of the "silicon-functional" silane is added which is necessary on the basis of calibrating tables for setting the desired pummel value. However, another possible mode of operation is to produce, before a new batch of partially acetalized PVA resin is processed into a film, a composite pane test element and to determine its pummel value. Starting with this definite pummel value, the amount of the silane suitable for the desired purpose, as empirically determined previously in series experiments, can then be added.

In practice, the amounts of silane are approximately between 0.005 and 0.2% by weight, based on 100 parts by weight of film composition.

The silanes to be added according to this invention can be admixed to the partially acetalized polyvinyl alcohol resins before they are processed into a film material. For example, the partially acetalized PVA resin particles, which do not as yet contain a plasticizer and which are maintained in constant motion, are sprayed with the silanes or silane solutions or dispersions. Suitable solvents or dispersing agents are preferably those which are completely or extensively inert with respect to the partially acetalized PVA resin. Suitable solvents are, for example, water or water/alcohol (e.g. ethanol) mixtures. Optionally, the solvent or dispersing agent is removed in the subsequent drying step, which is also done in the preparation of the partially acetalized PVA resin, when no silane is added, so that a pourable, partially acetalized PVA resin is obtained which is subsequently processed by the film manufacturers, after adding the required amount of plasticizer, according to conventional procedures, preferably according to the extrusion method, to obtain the film product.

However, preferably the process is carried out by compounding the silanes as well as the plasticizer with the partially acetalized polyvinyl alcohol resins during processing into a film, for example in an extruder in the molten phase. In this mode of operation, it is advantageous first to dissolve or disperse the silanes in the plasticizer to be added, before the silane/plasticizer mixture is added to the partially acetalized PVA resins to be extruded. Preferably, plasticizers are chosen wherein the silanes are soluble. Suitable for the process of this invention are the plasticizers mentioned hereinabove in connection with the prior art, wherein the preferred plasticizer is triethylene glycol di(2-ethylbutrate). The amounts of plasticizer to be added correspond to the quantities customary in the production of partially acetalized PVA films. Furthermore, it is possible to spread the silanes on top of the surface of the prepared film and to pull the film through an aqueous silane solution. The drying process is then carried out in the well known manner.

The modified partially acetalized PVA films of this invention are preferably utilized as adhesive films. This usage takes place in the manner customary in the composite safety glass industry.

Preferably, a partially butyralized polyvinyl alcohol film modified with silanes is used as an adhesive film which (a) has a plasticizer content of about 18 to about 65 parts by weight, preferably 33–44 parts by weight, per 100 parts by weight of partially butyralized PVA; (b) a water content of 0.2–0.9% by weight based on the weight of the adhesive film; and (c) an OH-group content, calculated as the vinyl alcohol, of 10–25, preferably 16–23% by weight, based on the partially butyralized PVA.

The composite safety glass panes wherein the partially acetalized PVA films modified according to this invention are employed consist of two or more glass layers and a partially acetalized, plasticizer-containing PVA film modified with silanes according to the present invention, which is disposed between respectively two glass plates or layers. Optionally, in a glass/glass composite, one glass layer can be replaced by a synthetic resin sheet, for example of an amorphous polyamide (see, for example, German Pat. No. 1,596,781). In this connection, it is advantageous to arrange between the two layers two adhesive films, the adhesive film in contact with the glass layer being modified according to the invention with silanes and the adhesive film in contact with the synthetic resin layer being unmodified. In case of composite elements consisting of more than two load-bearing layers, e.g. glass/synthetic resin/glass composites, the mode of operation can be similar. In case of glass/synthetic resin/synthetic resin/glass composites, only one unmodified partially acetalized PVA film is advantageously used between the synthetic resin/synthetic resin layers as the adhesive film.

This invention will be further understood from the following examples:

EXAMPLES 1–10

The penetration data mentioned in the following examples are obtained by the falling ball test according to DIN [German Industrial Standard] 52 306 (February 1973) or U.S.A. S., Z 26.1, test No. 26 (1966).

The change in the pummel values due to the silane addition as demonstrated in the following tables was obtained with composite safety glass panes produced in the following manner:

The silane was added to the partially butyralized polyvinyl alcohol PVB resin (content of OH-groups, calculated as the vinyl alcohol, 18.5% by weight) during the PVB film production in the extruder. The PVB resin providing the data for Table 1 originated from another batch than that resin providing the data for Table 2.

In the examples, composite panes were tested containing two glass plates of a thickness of 3 mm., as well as an interposed PVB film having a thickness of 0.76 mm.

The composite panes were produced at a temperature of 130°–135° C., a pressing force of 10–15 kp./cm$^2$, and a pressing time of 10–30 minutes.

As the plasticizer, triethylene glycol di(2-ethylbutyrate) was used in an amount of 35 parts by weight per 100 parts by weight of the partially butyralized PVA resin.

TABLE 1

| Example | % by Weight Silane (1) | Pummel Adhesion Values | m. Falling Ball Height (2) | % by Weight Water in Film | mm. Film Thickness |
|---|---|---|---|---|---|
| 1 | 0 | 10 | 1.50 | 0.5 | 0.76 |
| 2 | 0.3 | 7 | 2.50 | 0.5 | 0.76 |
| 3 | 0.4 | 5 | 4.00 | 0.5 | 0.76 |
| 4 | 0.5 | 3 | 5.50 | 0.5 | 0.76 |

(1) Isobutyltrimethoxysilane
(2) Height required to penetrate composite.

The data in Table 1 illustrates that the addition of isobutyltrimethoxysilane, a silicon functional-silane, reduces the pummel values and increases the penetration resistance of the composite.

TABLE 2

As demonstrated by the following examples, the adhesive strength is considerably increased with the addition of a "silicon-organofunctional" silane:

| Example | % by Weight Silane (*) | Pummel Adhesion Values | % by Weight Water in Film |
|---|---|---|---|
| 5 | 0 | 1 | 0.5 |
| 6 | 0.005 | 3 | 0.5 |
| 7 | 0.01 | 5 | 0.5 |
| 8 | 0.1 | 10 | 0.5 |

(*) γ-Glycidyloxypropyltrimethoxysilane

Examples 9 and 10 relate to the use of waste film together with fresh, partially butyralized polyvinyl alcohol resin. The pummel value is undefined due to the varying composition of the film material:

TABLE 3

| Example | % by Weight of Silanes (based on the total quantity) | Pummel Adhesion Values |
|---|---|---|
| 9 | 0.1 Silane 1 +0.45 Silane 2 | 5 |
| 10 | 0.2 Silane 1 0.6 Silane 2 | 2 |

Silane 1 = γ-glycidyloxypropyltrimethoxysilane
Silane 2 = isobutyltrimethoxysilane The quantitative data in the Tables 1 to 3 relate to 100 parts by weight of film composition. The inserted residues as well as the fresh materials consist of partially butyralized PVA.

What is claimed is:

1. A process for adjusting the adhesive force of plasticizer-containing, partially acetalized polyvinyl alcohol film to the surfaces of inorganic glasses to certain desired pummel adhesion values required for a given application in the production of composite safety glass panes, which comprises adding to a pre-existing partially acetalized polyvinyl alcohol resin composition, which composition contains an adhesive force adjusting silane and which composition is not capable of producing a film with the desired pummel adhesion value, from 0.005 to 0.7% by weight, based on the total weight of the partially acetalized polyvinyl alcohol resin of:

(a) a silicon-functional silane or a mixture of silicon-functional silanes to reduce the adhesive force of the film prepared from the resulting resin composition; or (b) a silicon-organofunctional silane or a mixture of silicon-organofunctional silanes to increase the adhesive force of the film prepared from the resulting resin composition; or (c) a mixture of at least one silicon-functional silane with at least one silicon-organofunctional silane to regulate the adhesive force of the film prepared from the resulting resin composition, to obtain the desired pummel adhesion values; the silicon-functional silane in (a) or (c) being represented by the general formula:

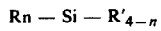

wherein R represents alike or different, saturated, straight-chain or branched alkyl groups of 1-18 carbon atoms, R' represents halogen, or identical or different saturated alkoxy or oxyalkoxy groups of 1-8 carbon atoms, and n is an integer from 0 to 3, and the silicon-organofunctional silane in (b) or (c) is represented by the general formula:

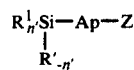

wherein $R^1$ represents a hydrolyzable group of Cl or OR''; with R'' representing a $C_{1-18}$ alkyl or oxyalkyl group; R' represents an alkyl group of 1-18 carbon atoms; A represents a bivalent alkylene group of 1-10 carbon atoms which may be branched; Z represents a functional group selected from the group consisting of

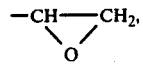

$- CH = CH_2$, and $- NR''' R''''$, wherein R''' represents H or aminoalkyl containing 2-8 carbon atoms and R'''' is H or R'''; n is an integer from 1 to 3 and p is 1 or when Z is $- CH = CH_2$, p is 0; and processing the resulting partially acetalized polyvinyl alcohol resin composition into a film with the desired pummel adhesion value; wherein said partially acetalized polyvinyl alcohol resin contains 10 to 25% by weight of vinyl alcohol groups, and said partially acetalized polyvinyl alcohol resin composition contains from 18 to 65 parts by weight of plasticizer per 100 parts by weight of the partially acetalized polyvinyl alcohol resin.

2. The process according to claim 1, in which isobutyltrimethoxysilane is the silicon-functional silane.

3. The process according to claim 1, in which γ-glycidyloxypropyltrimethoxysilane is the silicon-organofunctional silane.

4. The process according to claim 1, in which the partially acetalized polyvinyl alcohol resin is a butyralized polyvinyl alcohol.

5. The process according to claim 1, in which the partially acetalized polyvinyl alcohol resin is a butyralized polyvinyl alcohol which contains about 17-23% by weight, of vinyl alcohol groups.

6. The process of claim 4, in which the amount of silane added is from 0.005 to 0.2% by weight of the total weight of partially butyralized polyvinyl alcohol resin.

7. The process of claim 4, in which the partially butyralized polyvinyl alcohol resin contains from 33 to 44 parts of plasticizer per 100 parts of said resin.

8. The process according to claim 1, in which the silicon-functional silane or mixture of silicon-functional silanes added to the pre-existing partially acetalized polyvinyl alcohol resin composition is admixed with the resin composition prior to formation of the film.

9. The process of claim 1, in which the amount of silane added is from 0.005 to 0.2% by weight of the total weight of partially acetalized polyvinyl alcohol resin.

10. The process according to claim 1, in which a silicon-functional silane or a mixture of silicon-functional silanes is added in an amount of 0.3% by weight of the total weight of partially acetalized polyvinyl alcohol resin.

11. The process according to claim 1, in which a silicon-functional silane or a mixture of silicon-functional silanes is added in an amount of 0.4% by weight of the total weight of partially acetalized polyvinyl alcohol resin.

12. The process according to claim 1, in which a silicon-functional silane or a mixture of silicon-functional silanes is added in an amount of 0.5% by weight of the total weight of partially acetalized polyvinyl alcohol resin.

13. The process of claim 1, in which a silicon-organofunctional silane or mixture of silicon-organofunctional silanes is added in an amount of 0.005% by weight of the total weight of partially acetalized polyvinyl alcohol resin.

14. The process of claim 1, in which a silicon-organofunctional silane or mixture of silicon-organofunctional silanes is added in an amount of 0.01% by weight of the total weight of partially acetalized polyvinyl alcohol resin.

15. The process of claim 1, in which a silicon-organofunctional silane or mixture of silicon-organofunctional silanes is added in an amount of 0.1% by weight of the total weight of partially acetalized polyvinyl alcohol resin.

16. The process according to claim 1, in which a mixture of at least one silicon-functional silane with at least one organofunctional silane is added in an amount of 0.55% by weight of the total weight of partially acetalized polyvinyl alcohol resin.

17. The process according to claim 1, in which a mixture of at least one silicon-functional silane with at least one organofunctional silane is added in an amount of 0.7% by weight of the total weight of partially acetalized polyvinyl alcohol resin.

18. The process according to claim 1 in which the silicon-functional silane or mixture of the silicon-functional silanes is added to the resin to provide a film product of a windshield quality having a pummel adhesion value of from 2 to 5.

19. The process according to claim 1 in which the silicon-organofunctional silane or a mixture of the silicon-organofunctional silanes is added to the resin to provide a film product of construction quality having a pummel adhesion value of 7 to 10.

20. The process according to claim 1 which further comprises determining the pummel adhesion value of a film produced from a batch of partially acetalized polyvinyl alcohol resin and then adding one of said silanes or mixtures thereof to the remaining portion of the batch of resin to provide a film product having the desired pummel adhesion value.

21. A process for adjusting the adhesive force of plasticizer-containing, partially acetalized polyvinyl alcohol films to the surfaces of inorganic glasses to certain desired pummel adhesion values required for a given application in the production of composite safety glass panes, which comprises adding to a pre-existing partially acetalized polyvinyl alcohol resin composition which is not capable of producing a film with the desired pummel adhesion value, from 0.005 to 0.7% by weight, based on the total weight of the partially acetalized polyvinyl alcohol resin of a silicon-functional silane or a mixture of silicon-functional silanes to reduce the adhesion force of the film prepared from the resulting resin composition; and processing the resulting partially acetalized polyvinyl alcohol resin composition into a film with the desired pummel adhesion value; wherein said partially acetalized polyvinyl alcohol resin contains 10 to 25% by weight of vinyl alcohol groups, and said partially acetalized polyvinyl alcohol resin composition contains from 18 to 65 parts by weight of plasticizer per 100 parts by weight of the partially acetalized polyvinyl alcohol resin.

22. A composite safety pane comprising partially acetalized polyvinyl alcohol films produced in accordance with claim 1, bonded to at least one glass layer.

* * * * *